D. H. Southworth,
Cutter Head
Nº 7,827.          Patented Dec. 10, 1850.
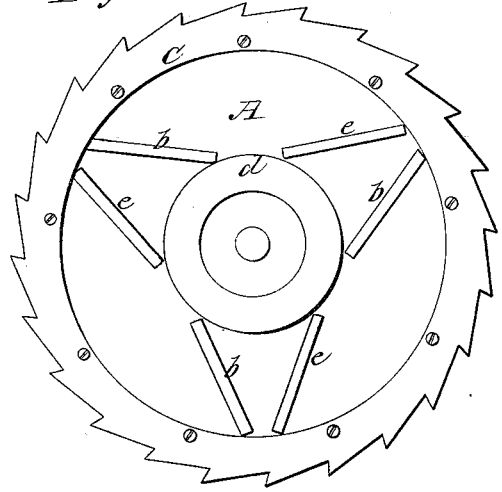
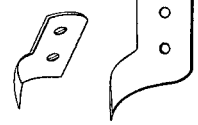
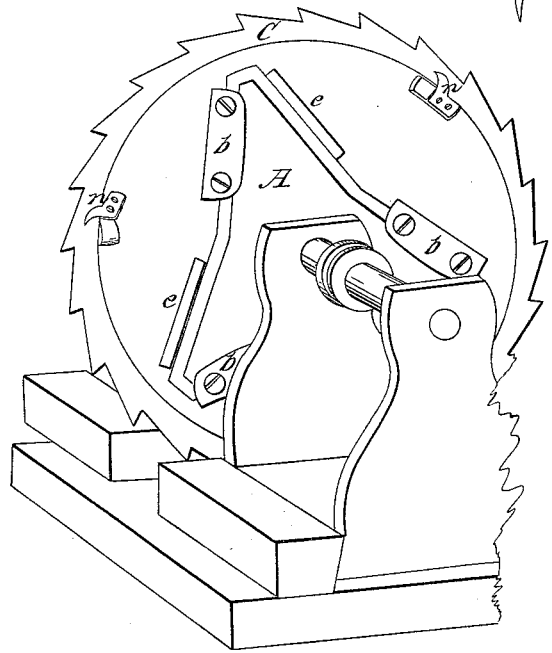

UNITED STATES PATENT OFFICE.

DANL. H. SOUTHWORTH, OF NEW YORK, N. Y.

PLANING-MACHINE.

Specification of Letters Patent No. 7,827, dated December 10, 1850.

*To all whom it may concern:*

Be it know that I, DANIEL H. SOUTH-WORTH, of the city, county, and State of New York, have invented a new and useful Improvement in Planing-Wheels; and I do hereby declare that the following is a full and exact description thereof and of the construction and operation of the same, reference being had to the annexed drawings, which are made a part of this specification, in which said drawings—

Figure 1 represents the front or fan of the wheel with the saw-blade attached; Fig. 2 represents a rear perspective view of the wheel with its several cutters and apertures, and with the saw attached; and Fig. 3 represents one of the clearing-cutters in two positions.

My invention mainly consists in so attaching a narrow circular-saw-blade to a strong, firm and steady cast or wrought-iron planing-wheel, to contain planing-cutters, that the saw may be stiffened and rendered free from trembling, shaking, or running in, and made to cut in advance of the planing-cutters, to level and cleanse the surface of the plank or timber so that the planing-cutters may with facility produce an extra-smooth surface; and in clearing-cutters being so arranged and adjusted as to immediately follow the saw—being attached to the wheel, near the periphery, on the rear or slab-side thereof—and cut and clear away any timber or slab which may be left to pass back of the saw and on the rear or slab-side of the same and of the wheel.

The wheel A is mounted upon the end of either a vertical or horizontal shaft, supported by suitable frame-work, and is furnished with three or more planing-cutters, *b b b*, each of which is adjusted in such a position that the cutting edge thereof has an angle of about twenty degrees with the radius of the wheel—the centerward end of the cutter being in advance of the opposite or outward end thereof. To the front of the periphery of the wheel, being properly counter-sunk for the purpose, is attached either whole or in segments, a narrow circular-saw-blade, C—wide enough, however, to project an inch or more beyond the periphery of the planing-wheel, the saw-blade being so attached, by screws or otherwise, that it may be easily removed and the reverse face turned to the plank or timber, whenever the teeth on one side have become worn, dulled, or out of set from long usage against the timber. Near the center of the face of the wheel is a circle *d*, made slightly prominent, to serve as a guide and bearing to the plank or timber during the operation of planing, and to prevent the planed surface from being scratched or marred by the secondary or back action of the saw-teeth or cutters. The planing cutters extend through oblique apertures to the rear of the wheel, where there are appropriate prominences or flanges to which the cutters are attached by set-screws or otherwise. The wheel is also provided with another set of apertures *e e e*, for the purpose of holding the cutters in a reversed position whenever occasion requires that the wheel be driven in a contrary direction for planing purposes; which happens whenever the saw is turned in the manner and for the reason above mentioned.

To the rear of the wheel, near the periphery thereof, and between the planing-cutters, are attached several clearing-cutters, $n_1$, $n$, $n$, (the number corresponding to that of the planing-cutters, or more if needed) for the purpose of cutting and clearing away whatever wood or slab may be left by the saw standing or passing in the rear thereof.

I further say and declare that I do not claim as any part of my invention, a planing-wheel, or planing or clearing-cutters; nor do I claim the combining of a circular-saw with a planing-wheel, by uniting two circular-saw-plates, and attaching planing-knives thereto, as these have been known and used before; but What I do claim as my invention and desire to secure by Letters Patent are the following new and useful improvements by way of new attachments and combinations:—

1. The attachment, either whole or in segments, of a narrow circular-saw-blade to the front of the periphery of an iron or other metallic planing-wheel, (properly counter-sunk for the purpose) in combination with the clearing and planing-cutters, so that the saw shall be stiffened and rendered free from trembling, shaking or running in, and made to cut in advance of the planing-cutters to cleanse and level the surface of the plank or timber, that the planing cutters may with facility produce an extra-smooth surface and be cleared of timber or slab by the clearing cutters as set forth; the attachment of the saw-blade to the wheel being such— by screws or otherwise—that the saw-blade may be easily removed or taken off for the purpose of turning the reverse face to the plank or timber, whenever the teeth on one side have become worn, dulled or out of set from long usage against the timber.

2. The clearing-cutters *n n n*, in combination with the saw and planing-wheel, arranged in the manner and for the purposes herein set forth.

DANIEL H. SOUTHWORTH.

Witnesses:
JOHN L. MOORE,
H. W. MOORE.